(12) United States Patent
Gangemi et al.

(10) Patent No.: US 10,747,525 B2
(45) Date of Patent: Aug. 18, 2020

(54) DISTRIBUTION OF A SOFTWARE UPGRADE VIA A NETWORK

(71) Applicant: INTERNATIONAL BUSINESS MACHINES CORPORATION, Armonk, NY (US)

(72) Inventors: Rosario Gangemi, Rome (IT); Francesco Lupini, Rome (IT); Bernardo Pastorelli, Rome (IT); Leonardo Rosati, Rome (IT)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/917,564

(22) Filed: Mar. 9, 2018

(65) Prior Publication Data

US 2019/0278580 A1    Sep. 12, 2019

(51) Int. Cl.
*G06F 9/44*      (2018.01)
*G06F 8/65*      (2018.01)
*H04L 12/26*     (2006.01)
*H04L 29/08*     (2006.01)
*G06F 16/14*     (2019.01)
*G06F 16/951*    (2019.01)

(52) U.S. Cl.
CPC ............. *G06F 8/65* (2013.01); *G06F 16/152* (2019.01); *G06F 16/951* (2019.01); *H04L 43/028* (2013.01); *H04L 67/34* (2013.01)

(58) Field of Classification Search
None
See application file for complete search history.

(56) References Cited

U.S. PATENT DOCUMENTS 7,353,511 B1 *  4/2008  Ziese .................. G06F 8/65
                                                  717/172
7,823,147 B2   10/2010  Moshir et al.
(Continued)

OTHER PUBLICATIONS

Fortunato, "Using Wireshark to Identify Application Signatures," Network Computing, Jan. 14, 2016, p. 1-5, https://www.networkcomputing.com/print/1323848, Accessed on Mar. 8, 2018.

(Continued)

*Primary Examiner* — Insun Kang
(74) *Attorney, Agent, or Firm* — Ewa M. Wozniak

(57) ABSTRACT

The invention relates to a method for distributing a software upgrade to client computing devices, the software upgrade being assigned to a software program, the client computing devices being communicatively coupled via a network, a target client of the client computing devices being adapted for executing the software program, the software program being adapted, when executed by the target client, for causing the target client to send via the network a signature specific to the software program, the method comprising intercepting network traffic from the client computing devices. The method comprises of detecting the signature in the intercepted traffic. The method comprises of collecting a network footprint from the intercepted traffic, the footprint being associated with the detected signature, the footprint comprising an identifier of the target client, the detected signature having been received from the target client. The method comprises of using the footprint for distributing the upgrade.

15 Claims, 1 Drawing Sheet

(56) References Cited

U.S. PATENT DOCUMENTS

| | | | |
|---|---|---|---|
| 8,151,258 B2 | 4/2012 | Russell et al. | |
| 8,225,304 B2 | 7/2012 | Shahindoust et al. | |
| 8,930,937 B2 | 1/2015 | McCaleb et al. | |
| 9,003,387 B2 | 4/2015 | Van Camp et al. | |
| 9,083,740 B1* | 7/2015 | Ma | H04L 63/1408 |
| 9,552,272 B1* | 1/2017 | Liang | G06F 11/0778 |
| 2005/0022159 A1* | 1/2005 | Aldrich | G06N 5/025 |
| | | | 717/104 |
| 2005/0097407 A1 | 5/2005 | Zhang et al. | |
| 2007/0169010 A1* | 7/2007 | Garner | G06F 8/10 |
| | | | 717/136 |
| 2011/0010700 A1* | 1/2011 | Lanner | G06F 9/44505 |
| | | | 717/170 |
| 2011/0106886 A1* | 5/2011 | Nolterieke | G06F 8/65 |
| | | | 709/204 |
| 2011/0239210 A1* | 9/2011 | Kotani | G06F 8/65 |
| | | | 717/171 |
| 2011/0296394 A1* | 12/2011 | Vidal | G06F 8/453 |
| | | | 717/171 |
| 2012/0054734 A1* | 3/2012 | Andrews | G06F 8/65 |
| | | | 717/171 |
| 2012/0137349 A1* | 5/2012 | Lundblade | G06F 8/61 |
| | | | 726/4 |
| 2015/0262009 A1* | 9/2015 | Szabo | G06K 9/00979 |
| | | | 709/224 |
| 2016/0050226 A1* | 2/2016 | Bettini | H04L 63/105 |
| | | | 726/1 |
| 2016/0299749 A1 | 10/2016 | Sharma et al. | |
| 2017/0262541 A1* | 9/2017 | Avkd | G06F 16/951 |
| 2017/0366600 A1 | 12/2017 | Sivan et al. | |
| 2018/0307480 A1* | 10/2018 | Doyle | G06F 8/658 |
| 2018/0316508 A1* | 11/2018 | Schulz | H04L 63/06 |
| 2018/0349502 A1* | 12/2018 | Maycock | G06F 16/24578 |
| 2019/0222493 A1* | 7/2019 | Pasupathy | G06F 16/951 |
| 2019/0250898 A1* | 8/2019 | Yang | G06F 8/65 |
| 2019/0370482 A1* | 12/2019 | Harland | G06F 9/45558 |

OTHER PUBLICATIONS

Liu, "Research on Remote Operating System Detection Using Libnet," International Conference on Industrial and Information Systems, 2009, p. 101-103, IEEE Computer Society.

Symantec, "Remote Push Install Endpoint Protection Clients," Symantec Support, Apr. 6, 2017, p. 1-3, TECH164327, https://support.symantec.com/en_US/article.TECH164327.html, Accessed on Mar. 8, 2018.

* cited by examiner

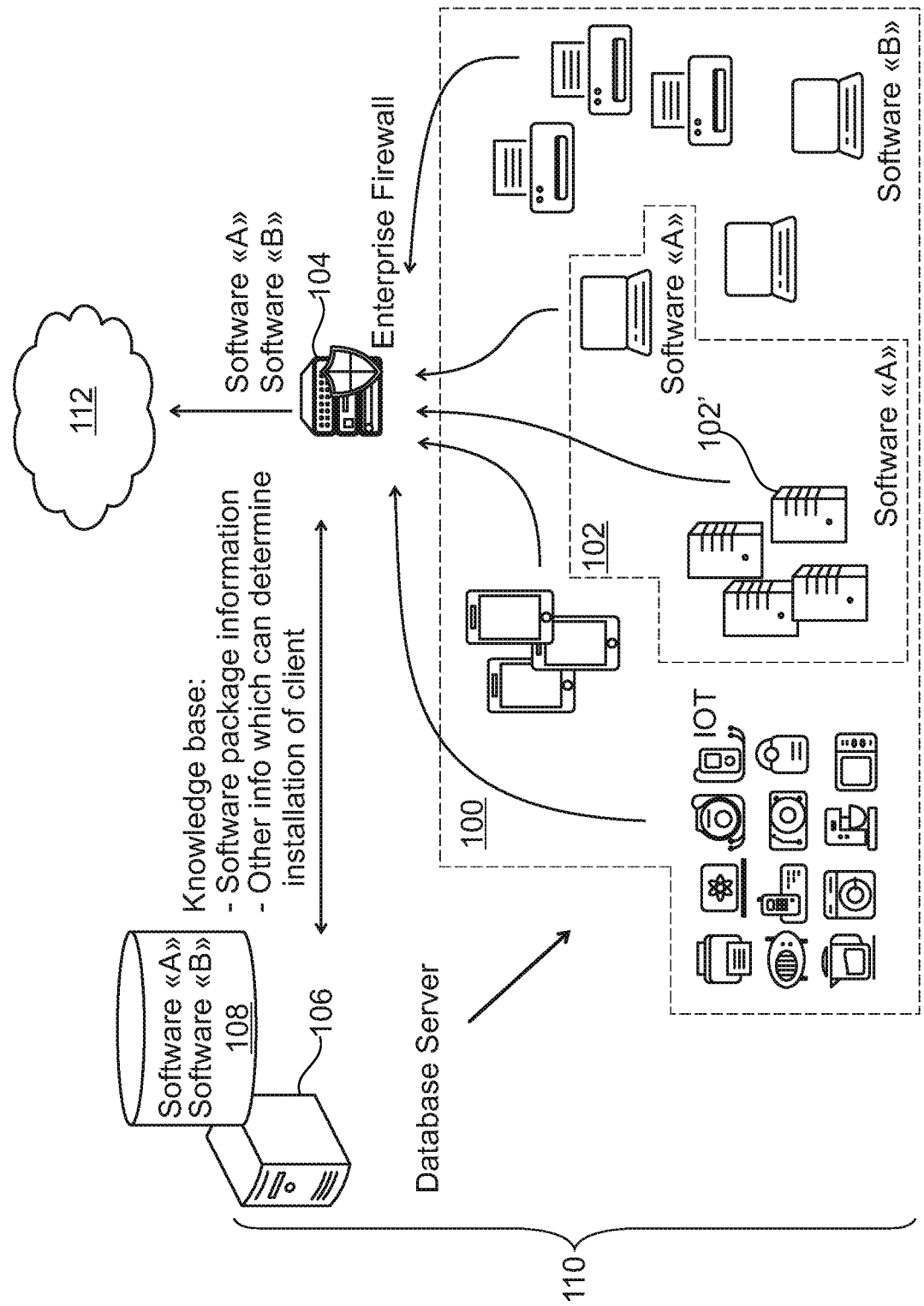

DISTRIBUTION OF A SOFTWARE UPGRADE VIA A NETWORK

BACKGROUND

The present invention relates to software management in a network, and more specifically, to bulk installation of client software packages via a client-server network.

A typical requirement for client-server applications, when a number of clients are active among a wider set of machines, is the capability of installing the required machines remotely and installing from a central point. A client-server application may be required to keep an environment of a large quantity of machines and an expanded customer network in compliance.

An endpoint management software may be implemented on the server. In order to complete an install or upgrade operation, the endpoint manager may require parameters of the remote machine, such as the operating system, which usually determines what package or build to install.

SUMMARY

It is an objective of the present invention to provide for a method, a computer program product, and a system for distributing a software upgrade to a plurality of client devices. Embodiments of the invention are given in the dependent claims. Embodiments of the present invention can be freely combined with each other if they are not mutually exclusive.

In one aspect, the invention relates to a method for distributing a software upgrade to a plurality of client computing devices, wherein the software upgrade is assigned to a software program, the client computing devices are communicatively coupled via a network, and a target client of the client computing devices is adapted for executing the software program. The software program is adapted, when executed by the target client, for causing the target client to send a program signature via the network, wherein the program signature being specific to the software program. The method comprises intercepting network traffic from the client computing devices. The method also comprises detecting the program signature in the intercepted network traffic. The method then comprises collecting a network footprint from the intercepted network traffic, the network footprint being associated with the detected program signature, the network footprint comprising an identifier of the target client, the detected program signature having been received from the target client. The method further comprises using the network footprint for distributing the software upgrade to the target client.

In another aspect, the invention relates to a computer program product for distributing a software upgrade to a plurality of client computing devices, wherein the software upgrade is assigned to a software program, the client computing devices are communicatively coupled via a network, and a target client of the client computing devices is adapted for executing the software program. The software program is adapted, when executed by the target client, for causing the target client to send a program signature via the network, wherein the program signature being specific to the software program. The computer program product comprises a computer readable storage medium having program instructions embodied therewith, wherein the program instructions are executable by a processor of a computer system to cause the computer system to perform intercepting network traffic from the client computing devices. The computer system also performs detecting the program signature in the intercepted network traffic. The computer system then performs collecting a network footprint from the intercepted network traffic, the network footprint being associated with the detected program signature, the network footprint comprising an identifier of the target client, the detected program signature having been received from the target client. The computer system further performs using the identifier for distributing the software upgrade to the target client.

In yet another aspect, the invention relates to a system for distributing a software upgrade to a plurality of client computing devices, wherein the software upgrade is assigned to a software program, the client computing devices are communicatively coupled via a network, and a target client of the client computing devices is adapted for executing the software program. The software program is adapted, when executed by the target client, for causing the target client to send a program signature via the network, wherein the program signature is specific to the software program. The system comprises an intercepting unit, adapted for intercepting network traffic from the client computing devices. The system also comprises a detecting unit, adapted for detecting the program signature in the intercepted network traffic. The system then comprises a collecting unit, adapted for collecting a network footprint from the intercepted network traffic, the network footprint being associated with the detected program signature, the network footprint comprising an identifier of the target client, the detected program signature having been received from the target client. The system further comprises a distributing unit, adapted for using the identifier for distributing the software upgrade to the target client.

BRIEF DESCRIPTION OF THE SEVERAL VIEWS OF THE DRAWINGS

In the following, embodiments of the invention are explained in greater detail, by way of example only, making reference to the drawings in which:

FIG. 1 schematically depicts a system for distributing a software upgrade to a plurality of client computing devices.

DETAILED DESCRIPTION

In an exemplary application scenario, a security-related investigation is performed on an environment when thousands of computing devices are present. A typical software for such investigation may, for instance, pursue the objective to detect and analyze a threat by installing a piece of client software on the computing devices among which the infected machines are expected. Such client software may then generate a status report of the respective device which is sent back to a central point for further analysis. In such complex, heterogeneous network environments, the challenge persists to quickly identify those devices which are eligible for receiving the software in order to shorten the investigation phase, and accordingly, the detection of a vulnerability, to a minimum.

In general, a program signature denotes herein any data content, data structure, data sequence, or other feature of data traffic transported over the network, such as a differentiating feature of a used net protocol (e.g., a hypertext transfer protocol (HTTP) GET function versus an HTTP POST function), which allows for an identification, including automated identification, of the software program which caused the target client to send the program signature via the network. In a simple example, the program signature comprises a string (i.e., text data) that specifies the name of the software program. The program signature may include, without limitation, the name of the software program, a version number of the software program, a specifier of an operating system running on the target client and under which the software program sending the program signature was executed or information specifying a processor architecture on which the software program sending the program signature was executed on the target client. The program signature may further include characteristic bits (i.e., flags), bytes, meta data (e.g., protocol header information) and communication schemes or sequences which can be uniquely assigned to the software program. For example, a web browser sending user agent data in the header of an HTTP request. Another example may include a document reader or office software sending identifying information to a web server of the developer or a third party service provider.

The step of intercepting network traffic may be performed by any network node which is adapted for redirecting network traffic, including internal nodes of the network or gateway devices (e.g., an enterprise firewall) connecting the network to another network. The interception may include a pre-selection of network connections, for instance based on a range or pattern of logical addresses, a name space or a domain of computing devices present in the network. The interception may include copying protocol meta data such as headers or the stripping of payload from the traffic. The interception may be followed by further processing on the same computing device or a different computing device in the network when the intercepted network traffic data is transported over the network to a different computing device.

The detection of the program signature in the intercepted network traffic may be performed by executing a script on the intercepted network traffic when the script is adapted for executing a logic on the intercepted network traffic and when the logic relates data elements of the intercepted network traffic to a predetermined rule or set of rules expressing the program signature. For example, a particular version of a given software program is detected using a logic that matches the intercepted network traffic for a string representing a name of the software program and a communication loop consisting of a request and a response. The request may contact a specific web server and the response may include an arrangement of data that is specific to the version of the software program that is to be detected. The specific technique of performing the detection of the particular software program may depend on the details of the program signature and may be chosen accordingly from a wide range of technologies including, for example, string search, pattern recognition or regular expressions.

For the purposes of this disclosure, the network footprint may include any data, data structure, data sequence, or other feature related to the transmission of the intercepted network traffic, such as a differentiating feature of the protocol (e.g., an HTTP GET function versus an HTTP POST function). The network footprint may also include the program signature via the network. An identifier of the target client from which the program signature was sent may also be included and the network footprint may be any network related feature found in the same request, response, session or stream as the signature.

An identifier of a computing device may include, for example, the target client and may denote network information specific to the mentioned computing device such that the computing device can be identified using the identifier. An identifier may include a logical address (e.g., an internet protocol (IP) address, a uniform resource identifier (URI), or a uniform resource locator (URL)), a network name, a port number, a hardware address (e.g., an address of a device by which the given computing device connects to the network), or any other specifier, or fragment of a specifier of the given computing device in any logical name space of the network.

By means of the program signature and the network footprint, a mutual assignment between the software program and the target client may identify the target client as eligible for receiving the software upgrade. The software upgrade may be distributed to the target client via the network. The distribution may be triggered immediately (i.e., real-time distribution) or the identifier may be appended to a list of identifiers (e.g., an IP address list) for coordinated distribution at a later time.

As understood herein, a "client" denotes either a computing device adapted for executing instructions of a computer program (e.g., a software program) using its processor and memory, but with insufficient capability of permanently or primarily providing a service (e.g., data delivery or processing time) to other computing devices; or alternatively, a computer program (e.g., a software program) to be executed on such client computing device for purposes other than permanently or primarily providing a service (e.g., data delivery or processing time) to other computing devices.

Accordingly, a "server" is understood within this disclosure as denoting either a computing device adapted for executing instructions of a computer program (e.g., an application related to a database) using its processor and memory for the purpose of permanently or primarily providing a service (e.g., data delivery or processing time) to other computing devices; or alternatively, a computer program (e.g., an application related to a database) to be executed on such server computing device for the purpose of permanently or primarily providing a service (e.g., data delivery or processing time) to other computing devices. It is understood further that a server computing device or a client computing device may be implemented as tangible hardware or as a virtual machine.

Embodiments of the invention may have the advantage of being unintrusive on the network environment. It may be unnecessary to run scripts on all targets or request network responses from all targets, which would mean generating extra payload from each endpoint, even if, eventually, the respective endpoint is found to be not eligible for the software upgrade to be installed. Particularly, it may be possible that endpoint eligibility be assessed without generating additional network traffic.

Embodiments may have the advantage of obtaining reliable information on the eligibility of a particular client for the upgrade, in contrast to approaches involving guessing or inferring deployment conditions of the software program.

Embodiments may have the further advantage that no suspicious network traffic is generated for endpoint eligibility investigation. For example, for approaches involving scanning of network ports (e.g., a ping command) in order to access a client computing device, which may be misinterpreted by an automated vulnerability watchdog as a distributed-denial-of-service (DDoS) attack. Furthermore, if a network is closed from external access upon detection of a serious vulnerability, intrusive methods like pinging may be forbidden by policy.

Embodiments may be less prone to complexity resulting from heterogeneity of deployment conditions for the software program. Specifically, the logics needed for detecting the program signature of a single software program may be substantially less complex than logics which may be needed for inferring its deployment conditions on an arbitrary computing device.

By comparison, it may also be possible to achieve a complexity reduction of methodology as the program signature of a given version of the software program, once released, can be expected to remain unchanged while inferring deployment conditions for each client. Complexity reduction of methodology may require updating an inferring logic regularly as new hardware or operating systems are developed.

Embodiments of the invention may achieve a higher efficiency in eligibility assessment, as it may be unnecessary to know access credentials for each client. Exceptions may have to be caught for devices with differing operating systems, such as Internet of Things (IOT) devices, which may be unable to understand or respond to a request from an investigating server.

In a preferable implementation, the software program is a client software adapted for performing endpoint management tasks on a client computing device. An exemplary endpoint management client may include, for example, IBM® BigFix® (IBM BigFix and all IBM BigFix-based trademarks and logos are trademarks or registered trademarks of International Business Machines Corporation and/or its affiliates). A security-related endpoint manager may typically include several application products that provide consolidated security and operations management, including endpoint management, like software patches. In particular, an endpoint manager may integrate attack detection with a broad set of remediation capabilities into a single endpoint security platform. This may provide proactive attack surface reduction or incident remediation.

A security-related example may include an application scenario that may be required to upgrade multiple endpoint management clients in a customer environment where suspicious software is running. In such scenario, embodiments of the invention may enable identification of the set of machines which best fits the investigation purpose, thus avoiding a bulk installation which can be expected to be delayed by, for example, missing passwords or unsupported operating systems.

In the given example, embodiments of the invention may achieve a beneficial effect by avoiding processing at each endpoint and querying the endpoint to determine if the system may be candidate for the upgrade and analyzing the traffic generated to understand if the machine is a good candidate.

Security analysis may be focused on a given set of software products that may be under attack or be considered malicious, such as Open secure sockets layer (SSL)-based products that were infected by the heartbleed vulnerability. Such client software may be known by endpoint management software like IBM® BigFix® through the endpoint management software's knowledge base.

When contacting a resource outside a local network (e.g., a wide area network (WAN) such as the internet), the client software establishes a connection, such as an update to the vendor side or an upload of diagnostic message to the software vendor service made of known IPs and an HTTP GET function. The client sends information over the network which can be retrieved at a single point (e.g., a network boundary node such as a gateway or firewall) and analyzed against a knowledge base, which can be further enhanced to correlate retrieved signatures with the software which generated it.

In the given example, the security team conducting the vulnerability investigation may benefit from embodiments of the method disclosed herein by being enabled to understand the targets of the investigation more easily and quickly and by delivering the upgrade to the requesting IPs for the given program signature from the firewall.

According to an embodiment, the program signature comprises information that may include software information descriptive of the software program, environment information descriptive of a deployment environment of the software program on the target client and hardware information descriptive of the target client or a combination thereof. The software information may include information relating to the software program itself or further entities associated with the software program, such as the name of the software program, a version of the software program, the year of issuance of the software program, information regarding a developer, a distributor or a service provider. The environment information specifies the deployment environment using, for example, a name or a version number of an operating system adapted for executing the software program, static or dynamic libraries or other software required for executing the software program under the operating system. The hardware information may be descriptive of a required processor architecture, volatile or non-volatile memory, network connectivity information such as a bandwidth and required periphery devices.

A program signature may allow for a highly selective distribution of builds of the software upgrade to multiple highly heterogeneous client computing devices. As a consequence, a complete roll out of a particular software upgrade to all eligible computing devices in the network may be completed in a shorter time, such that, for example, security issues of former versions of the software program may be eliminated earlier.

According to an embodiment, the network may be a local area network and may include a gateway device, the gateway device communicatively interfacing the local area network and a wide area network, the software program being further adapted, when executed by the target client, for causing the target client to perform the sending of the program signature via the network into the wide area network. The program signature may be intercepted at or by the gateway device.

For the purposes of this disclosure, a gateway device may be defined by its position within the network topology of the network (i.e., having at least one outbound connection), as opposed to requirements regarding the functional range of a given node. The expression 'performed at the gateway device' refers to performing the interception using a processor and memory of the dedicated device having a single communicative connection to and being solely controlled by the gateway device.

Performing the interception at or by a gateway device may result in a reduction of the amount of network traffic which is intercepted. Interception at or by the gateway device may be especially useful if the software program is known to send its program signature to a computing device in the wide area network. Interception at or by the gateway device may reduce or eliminate a need for further filtering, analyzing or sorting the network traffic before the detection. Interception by a dedicated computing device at the gateway device may reduce the requirement for computing power of the gateway device in order to perform the interception.

According to an embodiment, the interception includes executing a pattern matching algorithm on the network traffic. Pattern matching may allow for making more complex decisions on the network traffic. For instance, a sequence or loop pattern may be detected in the received network traffic. Pattern matching during interception may further allow for reducing the amount of intercepted network traffic further by filtering out only such traffic which matches a predetermined communication pattern.

According to an embodiment, the intercepted network traffic also includes network traffic destined to the at least one target client. This may have the advantage that the software upgrade can be triggered for a particular target client by incoming traffic (e.g., an incoming HTTP request). Triggering a software upgrade may reduce upgrade time since it may be unnecessary to wait for each target client to send its program signature. If incoming traffic has a program signature of the software program and the incoming traffic is directed to a particular target client, then the software upgrade may arrive at an earlier time. Furthermore, intercepting incoming network traffic may allow for an interception based on communication loops rather than repeated outbound communication originating from the target client. This may simplify matching or filtering criteria for reducing the amount of intercepted network traffic.

According to an embodiment, the interception may further include filtering candidate traffic from the intercepted network traffic when the candidate traffic has an increased probability of having the program signature and when the detection of the program signature is limited to the candidate traffic. Filtering may be based on a filter criterion such as an address pattern descriptive of a subset of the client computing devices, a data type or a traffic pattern descriptive of network protocol usage by the software program.

Filtering network traffic with an increased probability of including the program signature may be understood here as filtering out network traffic which does not contain the program signature. For example, the program signature is a string comprised by protocol header information of the network traffic and the intercepting could include sorting out all traffic which has no string data in its headers. In another example, the software program is known to send its program signature via a connection using the file transfer protocol (FTP) and all traffic involving protocols different from FTP could be ruled out.

In a further example, it is known beforehand that the software program is installed only on client computing devices within a particular company department, which is represented by a particular IP address range in the network. Hence, the interception can be focused on that address range, as all clients with IP addresses outside of this range will not contain the program signature.

As demonstrated in the previous examples, a significant reduction of intercepted traffic volume may be achieved by means of the filtering, which may reduce the required infrastructure for buffering or transporting the intercepted network traffic and for computing power for further processing the intercepted network traffic.

An address pattern may be understood here as an expression comprising a logical address with place holders, such that multiple logical addresses (e.g., URLs, URIs, IP addresses) are described. A data type for filtering the intercepted network traffic may be understood as being restricted to data types present in traffic meta data such as protocol headers, as opposed to data types of payload data, which are subject to subsequent analysis during the detection of the program signature. A traffic pattern may include descriptive information of the network protocol being used by the network traffic, such as the name or version of the network protocol, a differentiating feature of the protocol (e.g., HTTP GET as opposed to HTTP POST) or data structures (e.g., sequences, loops or trees) are descriptive of the way the network protocol is used by the intercepted network traffic.

The filter criterion thus specified may allow for a highly selective distribution of builds of the software upgrade to multiple clients highly heterogeneous computing devices. As a consequence, a complete roll out of a particular software upgrade to all eligible computing devices in the network may be completed in a shorter time such that, for example, security issues of former versions of the software program may be eliminated earlier.

According to an embodiment, the detection further comprises executing a pattern matching algorithm on the intercepted network traffic. Pattern matching may beneficially allow for making more complex decisions on the program signature. In this way, the software upgrade may be distributed to multiple client computing devices having a higher technical heterogeneity, such as different versions of the software program, different deployment environments or different hardware for which specialized builds have been issued.

According to an embodiment, the detection includes querying a database. The database may include a signature catalog and a software catalog. Each entry of the signature catalog may assign an entry of the software catalog and may include the program signature. A software catalog entry may include software information descriptive of the software program and may include the program signature being assigned to the entry of the software catalog containing software information descriptive of the software program.

Using a database for detecting the program signature may yield various advantages. A database may represent more complex relationships between program signatures, software information, environment information, hardware information, and customized builds of the software upgrade for the numerous possible combinations of such information. In addition, a database may provide sophisticated data handling routines when further development may be unnecessary in order to perform the method according to embodiments of the invention.

A database may provide a higher degree of flexibility for defining the possible program signatures (e.g., a list of strings defining such program signatures). Defining the signature catalog by a list of strings in a text file may be a valid alternative embodiment of the invention. A signature catalog or a software catalog may be custom data structures (e.g., data fields) which are intentionally added to the database for the purpose of enabling performance of the method using the database. Alternatively, one or both of the catalogs may be already present in the database before implementing the method according to embodiments.

According to an embodiment, the software information may further be descriptive of the software upgrade and may simplify the identification of a matching build of the software upgrade. Additionally, the software information may be a simplified assessment of the eligibility of the target client by reducing the complexity of the logic needed to match the program signature.

According to an embodiment, a database may be created, and the database may beneficially enable performing the method in environments where no organized data represents relationships between the software program, software information, environment information, hardware information, and the software upgrade of the software upgrade is available.

The creation of the database may be performed under different approaches. A manual approach may include using a sniffer, such as a network monitoring program for visualizing network traffic and subsequent input of recognized program signatures into the database. An example of a network monitoring program may include Wireshark® (Wireshark and all Wireshark-based trademarks and logos are trademarks or registered trademarks of Wireshark Foundation and/or its affiliates). For more complex environments, automated training or learning algorithms may be more appropriate. Automated creation of the database may still be based on manually entered information such as keywords provided by a network administrator of the network or a developer or distributor of the software program. It is understood that the program signature of a given software program may be provided together with the software program or a software upgrade of that software program by such developer or distributor.

According to an embodiment, the network footprint may include information, such as an identifier of a receiving computing device, an identifier of a computing device associated with the software program, an identifier of a network protocol or a traffic pattern descriptive of network protocol usage by the software program.

The network footprint may enable a more comprehensive identification of the software upgrade or one of its builds for which the considered target client is eligible. For example, the identifier of a receiving computing device may be specific to the version of the software program. In another example, the network protocol usage of the software program follows a traffic pattern which is specific to the operating system under which the software program sending the program signature is deployed.

According to an embodiment, searching may be based on the program signature, a matching build of the software upgrade or the matching build being adapted for implementing the software upgrade on the target client. Distributing may include distributing the matching build to the target client in case the searching is successfully completed. According to an embodiment, the searching is additionally based on the network footprint.

The software upgrade may be provided by a plurality of builds, such as specific compilations of the software program for a different system and the deployment parameters such as operating system or architecture parameters. A build of the software upgrade may be considered as matching if all of its distinctive parameters match the deployment and system parameters of the software program as installed on the target client. Without limitations, the searching may be based on a file directory comprising builds of the software upgrade, a database comprising information about the different builds and a list (e.g., a text file, table or spreadsheet of file names descriptive of the different builds). The step of searching may allow for a highly selective distribution of builds of the software upgrade to a highly heterogeneous plurality of client computing devices. As a consequence, a complete roll out of a particular software upgrade to all eligible computing devices in the network may be completed in a shorter time, such that, for example, security issues of former versions of the software program may be eliminated earlier.

According to an embodiment, the method may include caching the identifier when the distribution is being delayed until a distribution criterion is fulfilled, which may allow for deferring the upgrade to a suitable time. In an example, the identifier is an IP address which is appended to a list of detected IP addresses of eligible target clients for the upgrade. At daytime a large volume of network traffic is to be handled by the network and at nighttime, the network traffic is low, therefore, it is more favorable to distribute the software upgrade to the detected target clients during a low network traffic time (e.g., at 3 AM). Suitable distribution criteria may refer to, without limitation, a time value (e.g., a date and a time), a time difference since the last distribution of software upgrades, a threshold number of entries in the cache, or time dependent network statistics such as traffic volume measured at a particular point of the network over a predetermined period of time.

According to an embodiment, the system further includes a gateway device and a database server running on a local area network. The gateway device may be communicatively coupled to the database server via the network and may be communicatively interfacing with the network and a wide area network. The software program may be adapted when executed by the target client for causing the target client to perform the sending of the program signature via the network into the wide area network. The intercepting unit may be adapted for restricting the interception to network traffic destined to the wide area network. The intercepting unit may include the gateway device. The detecting unit, the collecting unit, and the distributing unit may include a database server.

The system may include one or more computing devices adapted for executing the method. If a single computing device is provisioned for performing the method according to an embodiment, the computing device may be equipped with sufficient computing performance in order to execute the detection of the program signature. However, if interception and detection are performed by the same computing device, it may be possible that the traffic transmission capability of said device may deteriorate or even fail if, for example, at a peak traffic time both the traffic to be transmitted by the computing device and the intercepted network traffic to be analyzed for detecting the program signature rise to peak values. Therefore, it may be advisable to provision independent computing resources at least for the interception and the detection. Independent computing resources may also constitute an economical advantage and it may be unnecessary to expand the computing capabilities of the intercepting unit only to bring intercepting unit into a good condition for performing the method according to embodiments of the present invention.

In case the program signature is managed in a signature catalog of a database according to an embodiment, it may be advantageous to use the computing resources offered by the database server instead. Database server resources may substantially exceed the computing resources of a gateway device which may be necessary for successfully performing the steps of detecting and collecting. For this purpose, the intercepted network traffic may be transferred (e.g., arranged in blocks or chunks) from the gateway to the server with a larger processor and memory resources. In addition, also performing the connecting step by the database server may be advantageous as no transport of the portion of intercepted network traffic including the program signature back to the gateway device may be necessary. Further, the database may not have to be synchronized between the database server and the gateway device in order to enable the gateway device to perform the collecting step.

For the purpose of the present disclosure, expressions such as unit, including a computing device or intercepting unit, including a gateway device may denote a hardware unit whose operation may be exclusively controlled by a processor of said computing device.

FIG. 1 shows an exemplary, schematic system of computing devices adapted for performing the method. The system comprises a gateway device 104, implemented as an enterprise firewall, and a database server 106, both of which being embedded in a local area network 110. The network 110 further comprises a plurality of client computing devices 100, which can be subdivided into numerous subsets, including a group of IoT devices, a group of mobile computing devices, a group of servers, a group of desktop workstations, and a group of periphery devices. The network provides mutual communicative connections between the clients 100, the firewall 104, and the server 106.

Each of the servers and one of the workstations have installed thereon an executable instance of the software program "Software A", which are summarized as target devices 102. Further heterogeneity may be demonstrated by one workstation having installed thereon an executable instance of a different software program "Software B". Firewall 104 may be additionally communicatively connected to a wide area network 112. Server 106 incorporates in its memory a database 108, which may be equivalently referred to as a knowledge base. Gateway 104 comprises an intercepting unit, implemented as a firmware module and adapted for performing the interception. Database server 106 comprises a detecting unit, a collecting unit, a searching unit and a distributing unit implemented as functions of an endpoint management server application such as IBM® BigFix®.

Said system may be operated as described in the following to implement the method. For the sole purpose of demonstration, the description may be focused on the target clients 102 hosting Software A, while it may be understood that the method may be performed for other various software programs registered in knowledge base 108 (e.g., Software B) equivalently.

A sending target client 102' out of the target clients 102 may initiate the method by contacting a node within wide area network 112. Such node may be a web server operated by a vendor, which needs further information about sending target client 102' in order to perform a service related to Software A. For this purpose, Software A may add its software signature to the request to the remote web server. For the sole purpose of demonstration, the signature may be a string comprising a name and a version of the software program (e.g., "Software A 2.4.1").

As the contacted node may be located in the wide area network, the request sent by the contacting target client may be forwarded to gateway 104, which may be adapted for redirecting the request to a routing node of wide area network 112. Gateway 104 may be one out of multiple gateways 104 connecting the local-area network 110 to external networks including wide area network 112.

Besides said redirection function, gateway 104 may be configured, for the sole purpose of demonstration, for making a copy of all traffic headers sent by computing devices which may not include peripheral devices or IoT devices. This may be done by the intercepting unit using a processor and memory of gateway device 104. The filtering of candidate clients is achieved using an IP address pattern, as network 110 has dedicated namespaces reserved for IOT and periphery devices.

The filtered network traffic may then be transferred via network 110 to database server 106 for further analysis. The detecting unit may go through all program signatures stored in knowledge base 108. Arriving at the logic describing the software signature of Software A, the detecting unit may detect connections comprising data format "string" and isolate from the string the connection sent by sending client 102' by detecting keyword "Software A" by string comparison. Version number "2.4.1" is then detected by pattern matching.

Next, the collecting unit may collect the IP address of sending target client 102' from further protocol header information of the connection where the string comprising the program signature was found. In order for the distributing unit to provide the correct build of the software upgrade to sending target client 102', the processor architecture of sending target client 102' may need to be determined. This may also be performed by the collecting unit, which knows from the logic that the request contains an integer with a length which is specific to the processor architecture on which the respective instance of Software A is running. The integer may be found to have a length of 64 bit, which may correspond to a 64-bit architecture according to the logic.

Subsequently, the searching unit may be activated to search a matching build for Software A 2.4.1 64-bit in the package repository, which is also part of database 108 hosted on a hard drive of database server 106. Database 108 may indicate that a security upgrade to version 2.5 is available on the hard drive of database server 106.

The path found in the file system for the 64-bit build of the 2.5 software upgrade is handed over to the distributing unit together with the IP address of sending target device 102', which appends both to a scheduled upgrade list created for that purpose within database 108. Finally, the upgrade is distributed to sending target client 102' at 01:45 AM, the distribution time scheduled for the upgrade list.

The present invention may be a system, a method or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGURES illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. Method for distributing a software upgrade to a plurality of client computing devices coupled via a network, the software upgrade being assigned to a software program, the method comprising:

intercepting, by a gateway device, network traffic from the client computing devices, wherein the gateway device intercepts the network traffic destined to a wide area network producing a set of intercepted network traffic, wherein the intercepting includes executing a pattern matching algorithm on the network traffic, wherein the pattern matching during the intercepting the network traffic filters out the network traffic that matches a predetermined communication pattern thereby reducing the set of intercepted network traffic;

filtering candidate traffic from the set of intercepted network traffic by filtering out the network traffic that does not contain a program signature;

detecting the program signature in the filtered candidate traffic, the program signature being specific to the software program;

collecting a network footprint from the filtered candidate traffic, wherein the network footprint is associated with the detected program signature, wherein the network footprint includes an identifier of a target client, and wherein the detected program signature has been received from the target client;

searching, based on the program signature and the network footprint, a matching build of the software upgrade, wherein the matching build implements the software upgrade on the target client; and distributing the software upgrade to the target client, using the identifier, wherein the distributing comprises distributing the matching build to the target client in case the searching is successfully completed.

2. The method of claim 1, wherein the program signature is selected from the group consisting of software information descriptive of the software program, environment information descriptive of a deployment environment of the software program on the target client and hardware information descriptive of the target client.

3. The method of claim 1, wherein the network is a local area network, wherein the network includes the gateway device, wherein the gateway device communicates by interfacing with the local area network and the wide area network, wherein the software program is further adapted when executed by the target client, wherein the target client performs the sending of the program signature via the network to the wide area network.

4. The method of claim 1, wherein the intercepted network traffic includes network traffic destined to the target client.

5. The method of claim 1, wherein the candidate traffic has an increased probability of comprising the program signature, and wherein the detection of the program signature is limited to the candidate traffic.

6. The method of claim 5, wherein the filtering is based on a filter criterion selected from the group consisting of an address pattern descriptive of a subset of the client computing devices, a data type and a traffic pattern descriptive of network protocol usage by the software program.

7. The method of claim 1, wherein the detection includes executing a pattern matching algorithm on the intercepted network traffic.

8. The method of claim 1, wherein the detection includes querying a database, wherein the database includes a signature catalog and a software catalog, wherein each entry of the signature catalog is assigned an entry of the software catalog, wherein each entry of the signature catalog includes the program signature, wherein an entry of the software catalog includes software information descriptive of the software program, wherein the entry of the signature catalog includes the program signature assigned to the entry of the software catalog and wherein the entry of the signature catalog includes software information descriptive of the software program.

9. The method of claim 8, wherein the software information is descriptive of the software upgrade.

10. The method of claim 8, further comprising creating the database based on data obtained from a plurality of signature catalog entries and a plurality of software catalog entries.

11. The method of claim 1, wherein the network footprint includes information selected from the group consisting of an identifier of a receiving computing device, an identifier of a computing device associated with the software program, an identifier of a network protocol and a traffic pattern descriptive of network protocol usage by the software program.

12. The method of claim 1, further comprising caching the identifier, wherein the distribution is delayed until a distribution criterion is fulfilled.

13. Computer program product for distributing a software upgrade to a plurality of client computing devices coupled via a network, the software upgrade being assigned to a software program, the computer program product comprising a computer readable storage medium having program instructions embodied therewith, the program instructions being executable by a processor of a computer system to cause the computer system to perform the following:

intercepting, by a gateway device, network traffic from the client computing devices, wherein the gateway device intercepts the network traffic destined to a wide area network producing a set of intercepted network traffic, wherein the intercepting includes executing a pattern matching algorithm on the network traffic, wherein the pattern matching during the intercepting the network traffic filters out the network traffic that matches a predetermined communication pattern thereby reducing the set of intercepted network traffic;

filtering candidate traffic from the set of intercepted network traffic by filtering out the network traffic that does not contain a program signature;

detecting the program signature in the filtered candidate traffic, the program signature being specific to the software program;

collecting a network footprint from the filtered candidate traffic, wherein the network footprint is associated with the detected program signature, wherein the network footprint includes an identifier of a target client, and wherein the detected program signature has been received from the target client;

searching, based on the program signature and the network footprint, a matching build of the software upgrade, wherein the matching build implements the software upgrade on the target client; and distributing the software upgrade to the target client, using the identifier, wherein the distributing comprises distributing the matching build to the target client in case the searching is successfully completed.

14. System for distributing a software upgrade to a plurality of client computing devices coupled via a network, the software upgrade being assigned to a software program, the system comprising:

one or more computer processors;

one or more computer-readable storage media;

program instructions stored on the computer-readable storage media for execution by at least one of the one or more processors, the program instructions comprising:

program instructions to intercept, by a gateway device, network traffic from the client computing devices, wherein the gateway device intercepts the network traffic destined to a wide area network producing a set of intercepted network traffic, wherein the intercepting includes executing a pattern matching algorithm on the network traffic, wherein the pattern matching during the intercepting the network traffic filters out the network traffic that matches a predetermined communication pattern thereby reducing the set of intercepted network traffic;

program instructions to filter candidate traffic from the set of intercepted network traffic by filtering out the network traffic that does not contain the program signature;

program instructions to detect the program signature in the filtered candidate traffic, the program signature being specific to the software program;

program instructions to collect a network footprint from the intercepted network traffic, wherein the network footprint is associated with the detected program signatures, wherein the network footprint includes an identifier of a target client, and wherein the detected program signature has been received from the target client;

program instructions to search, based on the program signature and the network footprint, a matching build of the software upgrade, wherein the matching build implements the software upgrade on the target client; and program instructions to distribute the software upgrade to the target client, using the identifier, wherein the distributing comprises distributing the matching build to the target client in case the searching is successfully completed.

15. The system of claim 14, further comprising a database server, wherein the network is a local area network, wherein the gateway device is communicatively coupled to the database server via the network, wherein the gateway device is communicatively interfacing the network and the wide area network, wherein the software program, when executed by the target client, causes the target client to perform the sending of the program signature via the network into the wide area network, wherein the software program restricts the interception to network traffic destined to the wide area network.

* * * * *